United States Patent
Hirasawa et al.

(10) Patent No.: US 9,362,573 B2
(45) Date of Patent: Jun. 7, 2016

(54) FUEL CELL

(75) Inventors: Rira Hirasawa, Toyota (JP); Yoshikazu Watanabe, Toyota (JP); Junji Nakanishi, Kasugai (JP); Shigeki Osuka, Okazaki (JP); Hiroo Yoshikawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 46 days.

(21) Appl. No.: 14/362,484

(22) PCT Filed: Dec. 6, 2011

(86) PCT No.: PCT/JP2011/006809
§ 371 (c)(1),
(2), (4) Date: Jun. 3, 2014

(87) PCT Pub. No.: WO2013/084256
PCT Pub. Date: Jun. 13, 2013

(65) Prior Publication Data
US 2014/0377682 A1   Dec. 25, 2014

(51) Int. Cl.
*H01M 8/02* (2006.01)
*H01M 8/24* (2006.01)
*H01M 8/10* (2006.01)

(52) U.S. Cl.
CPC ............ *H01M 8/0271* (2013.01); *H01M 8/023* (2013.01); *H01M 8/0297* (2013.01); *H01M 8/1004* (2013.01); *H01M 8/241* (2013.01); *H01M 8/028* (2013.01); *H01M 8/0276* (2013.01); *H01M 2008/1095* (2013.01); *H01M 2250/20* (2013.01); *Y02E 60/50* (2013.01); *Y02T 90/32* (2013.01)

(58) Field of Classification Search
CPC .......................................... H01M 8/02–8/0297
See application file for complete search history.

(56) References Cited

U.S. PATENT DOCUMENTS

| | | | |
|---|---|---|---|
| 6,261,711 B1 * | 7/2001 | Matlock | H01M 8/0247 429/513 |
| 2001/0051294 A1 | 12/2001 | Inoue et al. | |
| 2002/0127461 A1 | 9/2002 | Sugita et al. | |
| 2006/0035117 A1 * | 2/2006 | Marsacq | H01M 4/8605 429/10 |
| 2007/0042261 A1 | 2/2007 | Kohyama et al. | |
| 2007/0202381 A1 * | 8/2007 | Diaz | H01M 8/0273 429/434 |
| 2010/0104913 A1 * | 4/2010 | Yamauchi | H01M 8/0273 429/465 |
| 2010/0173222 A1 * | 7/2010 | Suzuki | H01M 8/0271 429/483 |
| 2013/0177832 A1 | 7/2013 | Tsubosaka et al. | |
| 2013/0260281 A1 | 10/2013 | Sato | |

FOREIGN PATENT DOCUMENTS

| | | |
|---|---|---|
| CN | 101632192 A | 1/2010 |
| JP | 2002-025587 A | 1/2002 |
| JP | 2007-066766 A | 3/2007 |

(Continued)

*Primary Examiner* — Scott J Chmielecki
(74) *Attorney, Agent, or Firm* — Kenyon & Kenyon LLP

(57) ABSTRACT

A fuel cell includes an electrolyte membrane, a first electrode, a second electrode and a stress suppressing structure. The first electrode is joined to one surface of the electrolyte membrane. The second electrode is joined to an other surface of the electrolyte membrane. The first peripheral section which is at least part of periphery of the first electrode is located on an inner side along a planar direction of the first electrode than respective peripheries of the electrolyte membrane and the second electrode. The stress suppressing structure is configured to suppress concentration of stress on a location along the first peripheral section in the electrolyte membrane.

12 Claims, 5 Drawing Sheets

(56) References Cited

FOREIGN PATENT DOCUMENTS

| JP | 2008130432 A | 6/2008 |
| JP | 2010-225484 A | 10/2010 |
| JP | 2012123949 A | 6/2012 |
| WO | 2004-088779 A1 | 10/2004 |
| WO | 2012035591 A1 | 3/2012 |

* cited by examiner

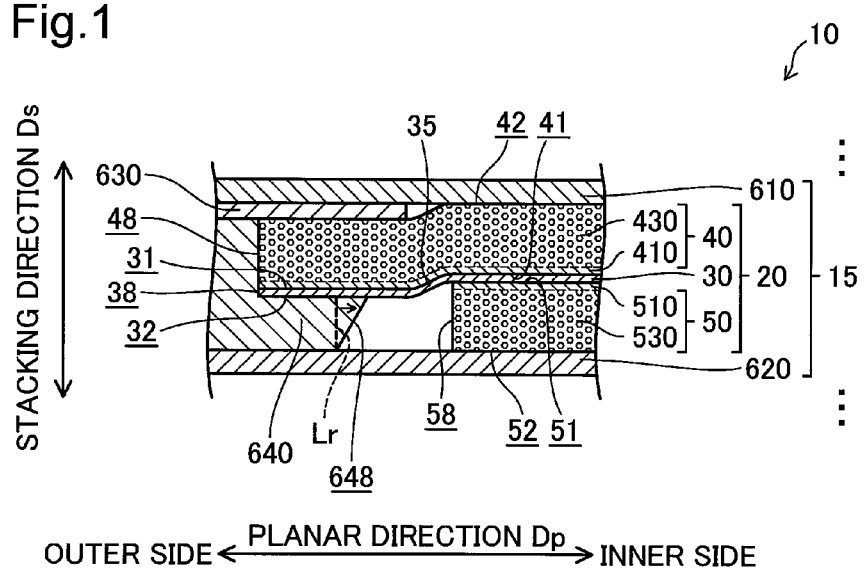
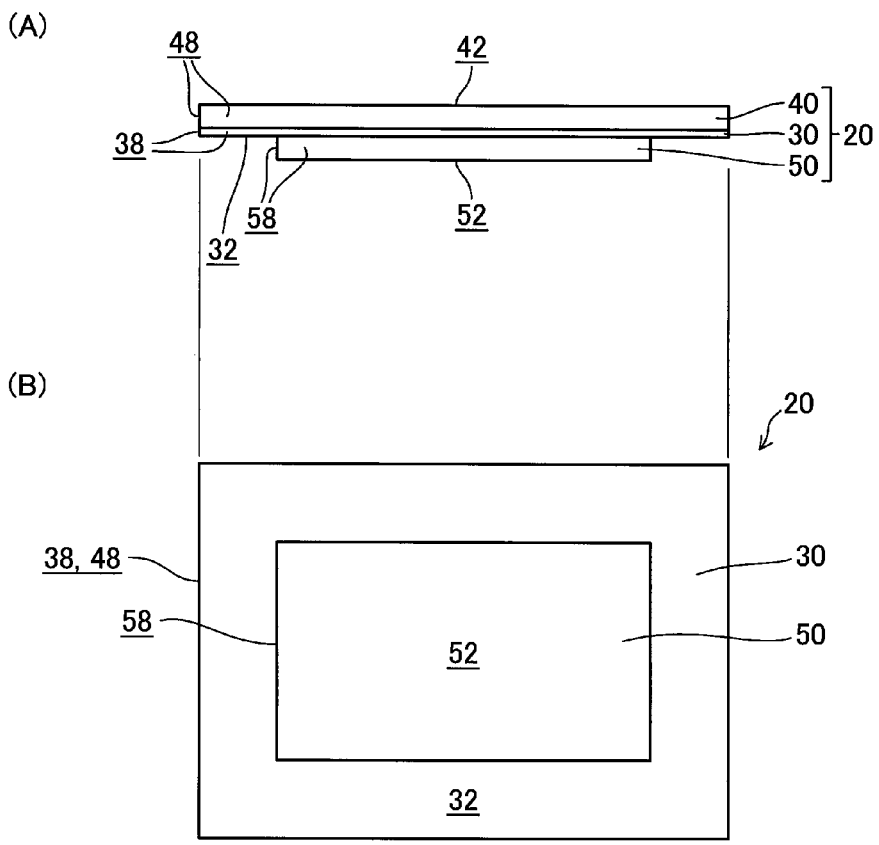

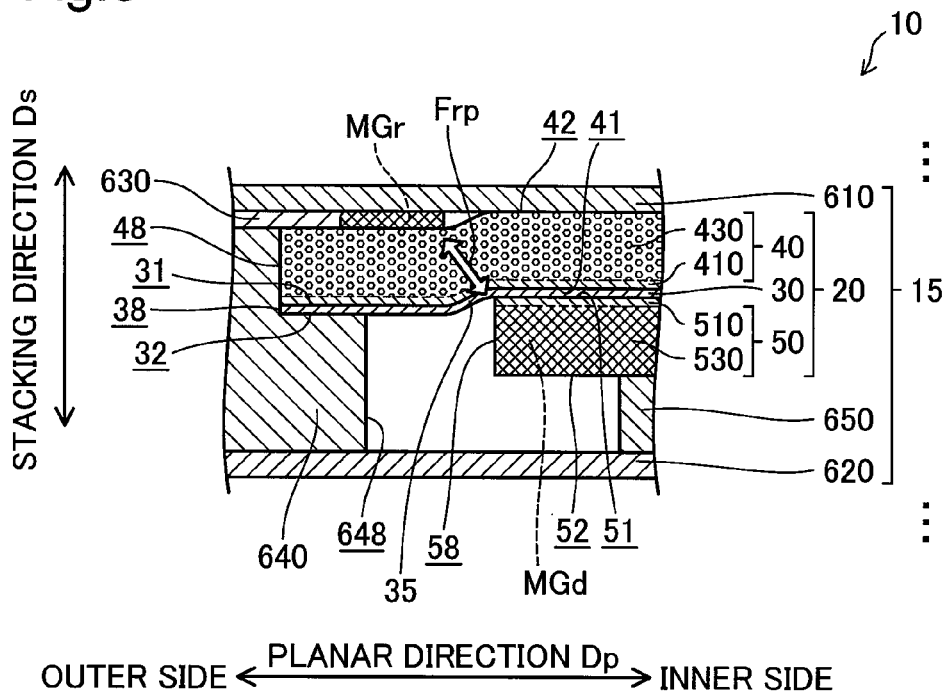
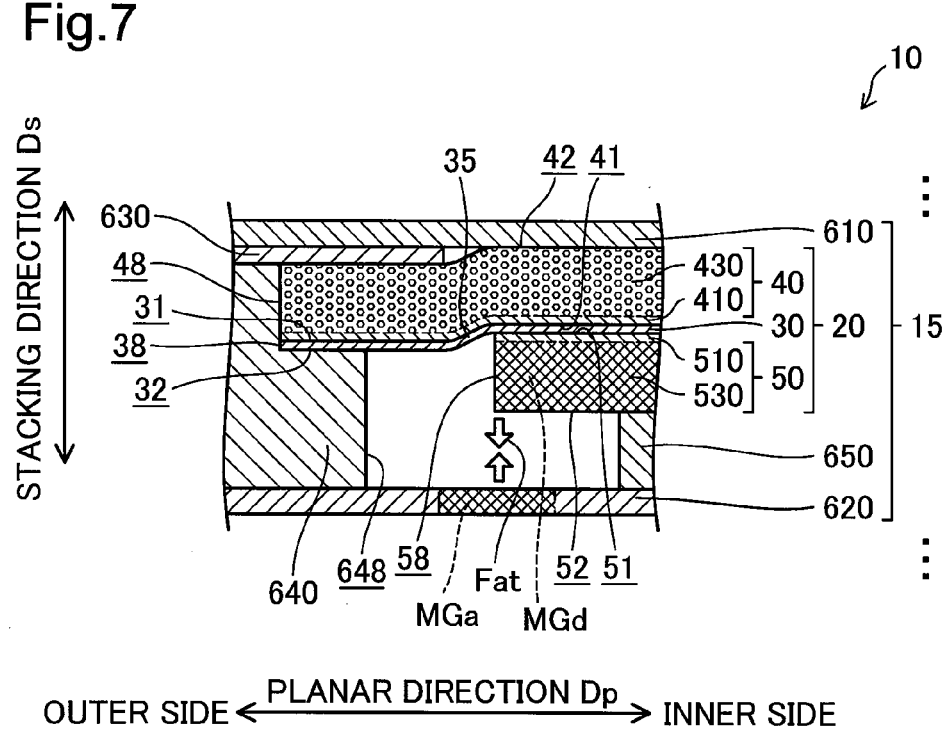

FUEL CELL

CROSS-REFERENCE TO RELATED APPLICATIONS

This is a national phase application based on the PCT International Patent Application No. PCT/JP2011/006809 filed on Dec. 6, 2011, the entire contents of which are incorporated herein by reference.

TECHNICAL FIELD

The present invention relates to a fuel cell.

BACKGROUND ART

A fuel cell may be configured to have a membrane electrode assembly (hereinafter referred to as "MEA") in which an electrolyte membrane is joined between two electrodes. A proposed configuration for such a fuel cell is that the two electrodes placed across the electrolyte membrane have different dimensions or more specifically the periphery of the smaller electrode is located on an inner side along a planar direction of the respective layers than the respective peripheries of the larger electrode and the electrolyte membrane (for example, Patent Literature 1).

CITATION LIST

Patent Literature

PTL 1: JP 2010-225484A

SUMMARY

Technical Problem

From the standpoint of protecting the electrolyte membrane from damage, it is desired to avoid the concentration of stress in the electrolyte membrane. In the case where the two electrodes placed across the electrolyte membrane have different dimensions, however, there is a problem that the concentration of stress is likely to occur in a location of the electrolyte membrane along the periphery of the smaller electrode.

In consideration of the problem described above, an object of the invention is to provide a technology that enhances the durability of a fuel cell.

Solution to Problem

In order to solve at least part of the problems described above, the invention is implemented by aspects and embodiments described below.

Aspect 1) According to Aspect 1, there is provided a fuel cell, comprising: an electrolyte membrane; a first electrode joined to one surface of the electrolyte membrane; and a second electrode joined to an other surface of the electrolyte membrane, the other surface being different from the one surface, wherein a first peripheral section which is at least part of periphery of the first electrode is located on an inner side along a planar direction of the first electrode than respective peripheries of the electrolyte membrane and the second electrode. The fuel cell further comprises: a stress suppressing structure configured to suppress concentration of stress on a location along the first peripheral section in the electrolyte membrane. This aspect suppresses the concentration of stress in the electrolyte membrane. As a result, this enhances the durability of the fuel cell.

Aspect 2) At least part of the stress suppressing structure may be configured such that an elastic member having a smaller transverse elasticity modulus than the electrolyte membrane is pressure welded to a first electrode-side of the electrolyte membrane and on an outer side along the planar direction than the first peripheral section. This aspect causes the elastic member to be elastically deformed in the planar direction and allows the electrolyte membrane to move along the planar direction, thereby suppressing the concentration of stress in the electrolyte membrane.

Aspect 3) At least part of the stress suppressing structure may be configured such that a joint strength between the electrolyte membrane and the second electrode on an outer side along the planar direction than the first peripheral section is made smaller than a joint strength between the electrolyte membrane and the second electrode on an inner side along the planar direction than the first peripheral section. This aspect causes the electrolyte membrane and the second electrode to be shifted relative to each other on the outer side of the first peripheral section having the relatively smaller joint strength between the electrolyte membrane and the second electrode, thereby suppressing the concentration of stress in the electrolyte membrane.

Aspect 4) In the above aspect, the electrolyte membrane and the second electrode may be joined to each other on the inner side along the planar direction than the first peripheral section, while not being joined to each other on the outer side along the planar direction than the first peripheral section. This aspect readily achieves the configuration that the joint strength between the electrolyte membrane and the second electrode on the outer side of the first peripheral section is made smaller than the joint strength between the electrolyte membrane and the second electrode on the inner side of the first peripheral section.

Aspect 5) At least part of the stress suppressing structure may be configured such that the first peripheral section of the first electrode has magnetism and that a magnetic material producing a repulsive force against the first peripheral section is placed on an opposite side of the second electrode which is opposed to a joint side of the second electrode to be joined to the electrolyte membrane. This aspect causes the repulsive force to relieve a pressing force applied from the first peripheral section to the electrolyte membrane, thereby suppressing the concentration of stress in the electrolyte membrane.

Aspect 6) At least part of the stress suppressing structure may be configured such that the first peripheral section of the first electrode has magnetism and that a magnetic material producing an attractive force to the first peripheral section is placed on an opposite side of the first electrode which is opposed to a joint side of the first electrode to be joined to the electrolyte membrane. This aspect causes the attractive force to relieve a pressing force applied from the first peripheral section to the electrolyte membrane, thereby suppressing the concentration of stress in the electrolyte membrane.

Aspect 7) At least part of the stress suppressing structure may be configured such that the electrolyte membrane and the second electrode are folded in advance toward the first electrode side according to a shape of the first peripheral section. This aspect relieves deformation of the electrolyte membrane before and after the first electrode and the second electrode are pressed against the electrolyte membrane, thereby suppressing the concentration of stress in the electrolyte membrane.

Aspect 8) The second electrode may include one electrode face which is a joint surface to be joined to the electrolyte membrane and an other electrode face which is an opposite surface opposed to the one electrode face, and at least part of the stress suppressing structure may be configured such that the other electrode face is made softer than the one electrode face. This aspect causes the other electrode face to be deformed to a relatively greater extent than the one electrode face in the second electrode and relieves deformation of the electrolyte membrane, thereby suppressing the concentration of stress in the electrolyte membrane.

Aspect 9) The second electrode may include one electrode face which is a joint surface to be joined to the electrolyte membrane; and an other electrode face which is an opposite surface opposed to the one electrode face, and at least part of the stress suppressing structure may be configured such that a recessed section provided as a concave part of the other electrode face is formed in advance in the second electrode, in a shape corresponding to a shape of a pressing member that presses the second electrode against the electrolyte membrane. This aspect relieves deformation of the electrolyte membrane via the second electrode by the pressing member, thereby suppressing the concentration of stress in the electrolyte membrane.

Aspect 10) At least part of the stress suppressing structure may be configured such that rigidity of the first electrode is made smaller than rigidity of the second electrode. This aspect causes the first electrode to be deformed to a greater extent than the second electrode and relieves deformation of the electrolyte membrane, thereby suppressing the concentration of stress in the electrolyte membrane.

Aspect 11) At least part of the stress suppressing structure may be configured such that rigidity of the second electrode is made smaller than rigidity of the first electrode. This aspect causes the second electrode to be deformed to a greater extent than the first electrode and relieves deformation of the electrolyte membrane, thereby suppressing the concentration of stress in the electrolyte membrane.

The invention is not limited to the aspects of the fuel cell but may be applied to any of various other aspects, for example, a vehicle driven using electric power of the fuel cell, a power generation system configured to supply electric power of the fuel cell, and a manufacturing method of the fuel cell. The invention is not at all limited to the above aspects, but may be implemented by any of various aspects within the scope of the invention.

BRIEF DESCRIPTION OF DRAWINGS

FIG. 1 is a diagram illustrating the cross sectional configuration of a fuel cell according to a first embodiment;

FIG. 2 is diagrams illustrating the general configuration of an MEA according to the first embodiment;

FIG. 6 is a diagram illustrating the cross sectional configuration of a fuel cell according to a third embodiment;

FIG. 7 is a diagram illustrating the cross sectional configuration of a fuel cell according to a fourth embodiment;

DESCRIPTION OF EMBODIMENTS

Figure 3:
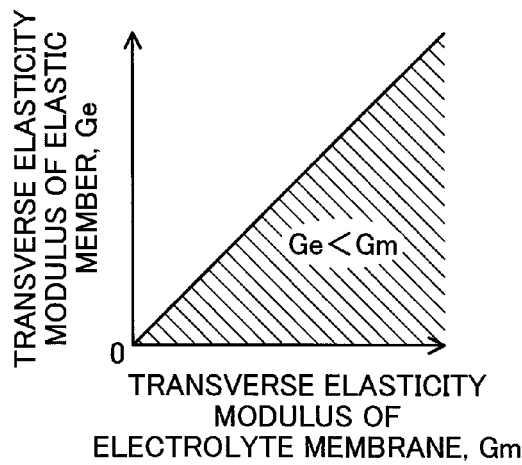
FIG. 3 is a chart showing a relationship between transverse elasticity modulus of an electrolyte membrane and transverse elasticity modulus of an elastic member according to the first embodiment.

In order to further clarify the configurations and the functions of the invention described above, the following describes fuel cells to which the invention is applied.

A. First Embodiment

FIG. 1 is a diagram illustrating the cross sectional configuration of a fuel cell 10 according to a first embodiment. The fuel cell 10 is a device that electrochemically generates electricity using reactive gases. According to this embodiment, the fuel cell 10 is a polymer electrolyte fuel cell. According to this embodiment, the fuel cell 10 uses a hydrogen-containing fuel gas and an oxygen-containing oxidizing gas as the reactive gases.

The fuel cell 10 includes a plurality of cells 15. The cell 15 is a unit cell that conducts an electrochemical reaction to directly take out electricity from the reactive gases. In the fuel cell 10, the plurality of cells 15 are stacked one upon another.

In the description of the embodiment, the direction in which the plurality of cells 15 are stacked in the fuel cell 10 is called "stacking direction Ds", and the direction along the surface of the cell 15 perpendicular to the stacking direction Ds is called "planar direction Dp". In the description of the embodiment, in the planar direction Dp, the direction toward the center of the cell 15 is called "on the inner side along the planar direction Dp", and the opposite direction is called "on the outer side along the planar direction Dp".

The cell 15 of the fuel cell 10 includes a membrane electrode assembly (MEA) 20, an anode separator 610 and a cathode separator 620. In the cell 15, the MEA 20 is placed between the anode separator 610 and the cathode separator 620.

The anode separator 610 and the cathode separator 620 of the cell 15 are made of a material having the sufficient electrical conductivity for collection of electricity generated in the MEA 20, as well as the sufficient durability, heat resistance and gas impermeability for the supplies of the reactive gases to the MEA 20. According to this embodiment, the material used for the anode separator 610 and the cathode separator 620 is a carbon resin. According to another embodiment, the material may be, for example, stainless steel, titanium, a titanium alloy or a conductive ceramic material.

According to this embodiment, the anode separator 610 and the cathode separator 620 are provided separately. According to another embodiment, with respect to two adjacent cells 15, the anode separator 610 of one cell 15 may be formed integrally with the cathode separator 620 of the other cell 15.

According to this embodiment, the anode separator 610 is in contact with the MEA 20. According to another embodiment, however, a flow path in which the fuel gas flows may be formed between an anode diffusion layer 430 and the anode separator 610.

According to this embodiment, the cathode separator 620 is in contact with the MEA 20. According to another embodiment, however, a flow path in which the oxidizing gas flows may be formed between a cathode diffusion layer 530 and the cathode separator 620.

FIG. 2 is diagrams illustrating the general configuration of the MEA 20 according to the first embodiment. The MEA 20 of FIG. 2 shows the state before being placed between the anode separator 610 and the cathode separator 620. FIG. 2A illustrates the MEA 20 viewed from the side face. FIG. 2B illustrates the MEA 20 viewed from the cathode side. The MEA 20 includes an electrolyte membrane 30, an anode electrode 40 and a cathode electrode 50.

The electrolyte membrane 30 of the MEA 20 is a membrane-like proton conductor having proton conductivity. According to this embodiment, the electrolyte membrane 30 is a perfluorosulfonic acid ion exchange membrane using an ionomer resin.

The electrolyte membrane 30 has an anode face 31 as one surface of the electrolyte membrane 30, a cathode face 32 as the other surface of the electrolyte membrane 30, and a peripheral face 38 as periphery of the electrolyte membrane 30. The anode electrode 40 is joined to the anode face 31 of the electrolyte membrane 30. The cathode electrode 50 is joined to the cathode face 32 of the electrolyte membrane 30. According to this embodiment, the electrolyte membrane 30 is a membrane in a rectangular shape. The anode face 31 and the cathode face 32 are rectangular, and the peripheral face 38 defines four sides of the anode face 31 and the cathode face 32.

As shown in FIG. 1, the anode electrode 40 of the MEA 20 includes an anode catalyst layer 410 and an anode diffusion layer 430. The anode catalyst layer 410 and the anode diffusion layer 430 are stacked in this order on the anode face 31 of the electrolyte membrane 30 to form the anode electrode 40.

As shown in FIG. 1, the cathode electrode 50 of the MEA 20 includes a cathode catalyst layer 510 and a cathode diffusion layer 530. The cathode catalyst layer 510 and the cathode diffusion layer 530 are stacked in this order on the cathode face 32 of the electrolyte membrane 30 to form the cathode electrode 50.

The anode catalyst layer 410 and the cathode catalyst layer 510 are made of a material having gas permeability and electrical conductivity, and a catalyst accelerating the electrochemical reaction of hydrogen with oxygen (for example, platinum or a platinum alloy) is supported on the material. According to this embodiment, the anode catalyst layer 410 and the cathode catalyst layer 510 consist of carbon carriers with a platinum catalyst supported thereon.

The anode diffusion layer 430 and the cathode diffusion layer 530 are made of a material having gas permeability and electrical conductivity. For example, a carbon porous body such as carbon cloth or carbon paper may be used for the material of the anode diffusion layer 430 and the cathode diffusion layer 530.

The anode electrode 40 has an electrode face 41 as one surface of the anode electrode 40, an electrode face 42 as the other surface of the anode electrode 40 and a peripheral face 48 as periphery of the anode electrode 40. The electrode face 41 of the anode electrode 40 is joined to the anode face 31 of the electrolyte membrane 30. According to this embodiment, as shown in FIG. 2, the anode electrode 40 is a rectangular electrode in the same size as that of the electrolyte membrane 30. The electrode faces 41 and 42 are rectangular, and the peripheral face 48 defines four sides of the respective electrode faces 41 and 42. According to another embodiment, the size of the anode electrode 40 may be larger than or smaller than the size of the electrolyte membrane 30.

The cathode electrode 50 has an electrode face 51 as one surface of the cathode electrode 50, an electrode face 52 as the other surface of the cathode electrode 50 and a peripheral face 58 as periphery of the cathode electrode 50. The electrode face 51 of the cathode electrode 50 is joined to the cathode face 32 of the electrolyte membrane 30. According to the embodiment, as shown in FIG. 2, the cathode electrode 50 is a rectangular electrode in a smaller size than those of the electrolyte membrane 30 and the anode electrode 40. The electrode faces 51 and 52 are rectangular, and the peripheral face 58 defines four sides of the respective electrode faces 51 and 52.

According to this embodiment, the cathode electrode 50 is the first electrode joined to one surface of the electrolyte membrane 30. The peripheral face 58 of the cathode electrode 50 is the first peripheral section that is at least part of the periphery of the first electrode. According to this embodiment, the planar direction Dp in the fuel cell 10 is a direction along the electrode faces 51 and 52 of the cathode electrode 50. According to this embodiment, the anode electrode 40 is the second electrode that is joined to the other surface of the electrolyte membrane 30 and is larger in size than the first electrode.

According to this embodiment, the dimension of the cathode electrode 50 along the planar direction Dp is smaller than those of the electrolyte membrane 30 and the anode electrode 40. As shown in FIGS. 1 and 2, the peripheral face 58 of the cathode electrode 50 is accordingly located on the inner side along the planar direction Dp than the peripheral face 38 of the electrolyte membrane 30 and the peripheral face 48 of the anode electrode 40.

As shown in FIG. 1, according to this embodiment, the cell 15 of the fuel cell 10 includes a plate-like member 630 and an elastic member 640, in addition to the MEA 20, the anode separator 610 and the cathode separator 620.

The plate-like member 630 of the cell 15 is a plate made of metal (e.g., aluminum or stainless steel) and is also called sealing plate or sealing sheet. The plate-like member 630 is located on the outer side along the planar direction Dp than the peripheral face 58 of the cathode electrode 50 over the area from between the electrode face 42 of the anode electrode 40 and the anode separator 610 to between the elastic member 640 and the anode separator 610. The plate-like member 630 serves to seal between the anode electrode 40 and the anode separator 610 and prevent invasion of the elastic member 640 to the electrode face 42-side of the anode electrode 40. According to another embodiment, the anode separator 610 may be protruded toward the anode electrode 40-side to seal between the anode electrode 40 and the anode separator 610 without providing the plate-like member 630 as a separate member.

The plate-like member 630 also works as a pressure member that presses the electrode face 42 of the anode electrode 40 against the electrolyte membrane 30. Pressing the anode electrode 40 by the plate-like member 630 causes the electrolyte membrane 30 to have a deformed section 35 that is deformed toward the cathode electrode 50-side and is formed along the peripheral face 58 of the cathode electrode 50.

The elastic member 640 of the cell 15 is a member made of a resin material. The elastic member 640 is formed on the cathode electrode 50-side of the electrolyte membrane 30 and on the outer side along the planar direction Dp than the peripheral face 58 of the cathode electrode 50 to be pressure welded to the cathode face 32 of the electrolyte membrane 30. According to this embodiment, the elastic member 640 is formed to be further extended to the peripheral face 38 of the electrolyte membrane 30, the peripheral face 48 of the anode electrode 40 and the plate-like member 630.

According to this embodiment, the elastic member 640 is formed by injection molding of a resin material to the MEA 20. According to another embodiment, the elastic member 640 may be formed separately from the MEA 20 or may be formed by injecting and solidifying a resin material having adhesiveness between the anode separator 610 and the cathode separator 620 across the MEA 20.

FIG. 3 is a chart showing a relationship between transverse elasticity modulus Gm of the electrolyte membrane 30 and transverse elasticity modulus Ge of the elastic member 640 according to the first embodiment. FIG. 3 illustrates this relationship with the transverse elasticity modulus Gm of the electrolyte membrane 30 as abscissa and the transverse elasticity modulus Ge of the elastic member 640 as ordinate. According to the first embodiment, the transverse elasticity modulus Ge of the elastic member 640 is smaller than the transverse elasticity modulus Gm of the electrolyte membrane 30. In other words, the relationship between the transverse elasticity modulus Ge of the elastic member 640 and the transverse elasticity modulus Gm of the electrolyte membrane 30 is in a hatched range satisfying "Ge<Gm" in FIG. 3.

As shown in FIG. 1, an end face 648 of the elastic member 640 extended from the cathode face 32 of the electrolyte membrane 30 to the cathode separator 620 follows deformation of the electrolyte membrane 30 accompanied with an increase in compression force along the stacking direction Ds to be displaced from an initial position Lr of the end face 648 prior to compression to the inner side along the planar direction Dp.

The fuel cell 10 of the first embodiment described above is configured, such that the elastic member 640 having the smaller transverse elasticity modulus than the electrolyte membrane 30 is pressure welded to the cathode face 32 of the electrolyte membrane 30 on the outer side along the planar direction Dp than the peripheral face 58 of the cathode electrode 50, as at least part of the stress suppressing structure to suppress the concentration of stress on the deformed section 35 of the electrolyte membrane 30. This configuration of the first embodiment causes the elastic member 640 to be elastically deformed in the planar direction Dp and allows the electrolyte membrane 30 to move along the planar direction Dp, thereby suppressing the concentration of stress in the electrolyte membrane 30. As a result, this enhances the durability of the fuel cell 10.

B. Second Embodiment

Figure 4:
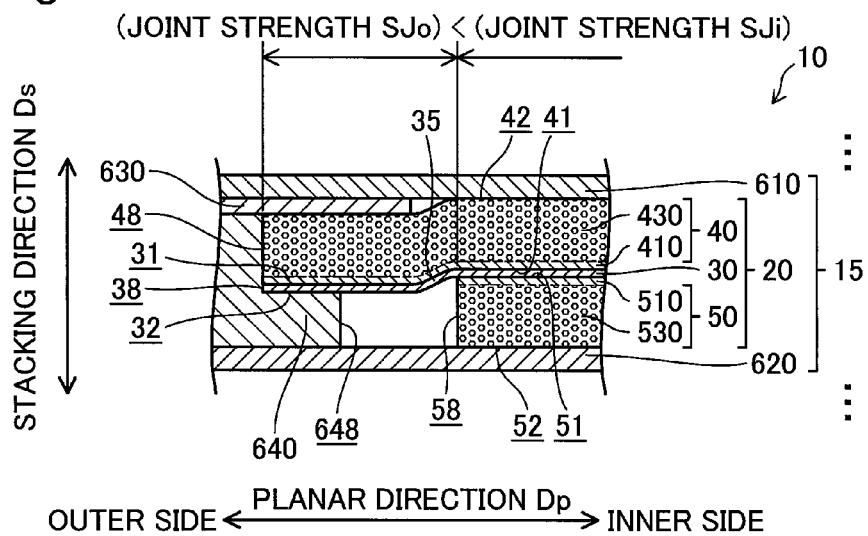
FIG. 4 is a diagram illustrating the cross sectional configuration of a fuel cell according to a second embodiment.

FIG. 4 is a diagram illustrating the cross sectional configuration of a fuel cell 10 according to a second embodiment. The fuel cell 10 of the second embodiment has the same configuration as that of the first embodiment, except different properties of the MEA 20. According to the second embodiment, it is preferable that the transverse elasticity modulus Ge of the elastic member 640 is smaller than the transverse elasticity modulus Gm of the electrolyte membrane 30, but the transverse elasticity modulus Ge of the elastic member 640 may be identical with or even larger than the transverse elasticity modulus Gm of the electrolyte membrane 30.

The properties of the MEA 20 of the second embodiment are similar to those of the first embodiment, except that the joint strength between the electrolyte membrane 30 and the anode electrode 40 on the outer side along the planar direction Dp than the peripheral face 58 of the cathode electrode 50 is made smaller than that on the inner side along the planar direction Dp than the peripheral face 58 of the cathode electrode 50. More specifically, a joint strength SJo between the electrolyte membrane 30 and the anode electrode 40 on the outer side along the planar direction Dp than the peripheral face 58 of the cathode electrode 50 is smaller than a joint strength SJi between the electrolyte membrane 30 and the anode electrode 40 on the inner side along the planar direction Dp than the peripheral face 58 of the cathode electrode 50. The joint strength between the electrolyte membrane 30 and the anode electrode 40 may be varied by changing, for example, the amount and the type of the joining material and the joining conditions (pressure, temperature, humidity and processing time).

According to another embodiment, the electrolyte membrane 30 and the anode electrode 40 may be joined to each other on the inner side along the planar direction Dp than the peripheral face 58 of the cathode electrode 50, while being not joined to each other on the outer side along the planar direction Dp than the peripheral face 58 of the cathode electrode 50. This readily achieves the configuration that the joint strength between the electrolyte membrane 30 and the anode electrode 40 on the outer side along the planar direction Dp than the peripheral face 58 of the cathode electrode 50 is made smaller than that on the inner side along the planar direction Dp than the peripheral face 58 of the cathode electrode 50.

Figure 5:
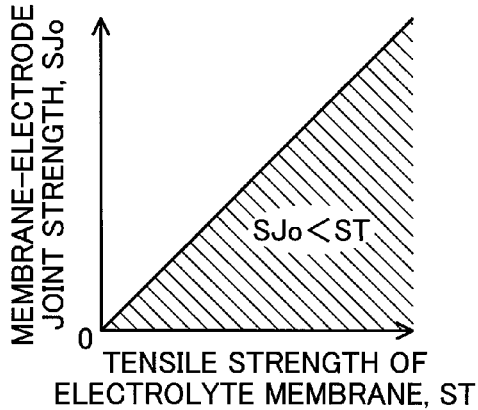
FIG. 5 is a chart showing a relationship between tensile strength of the electrolyte membrane and joint strength according to the second embodiment

FIG. 5 is a chart showing a relationship between tensile strength ST of the electrolyte membrane 30 and joint strength SJo according to the second embodiment. FIG. 5 illustrates this relationship with the tensile strength ST of the electrolyte membrane 30 as abscissa and the joint strength SJo between the electrolyte membrane 30 and the anode electrode 40 as ordinate. According to the second embodiment, it is preferable that the joint strength SJo between the electrolyte membrane 30 and the anode electrode 40 is smaller than the tensile strength ST of the electrolyte membrane 30. In other words, it is preferable that the relationship between the joint strength SJo and the tensile strength ST is in a hatched range satisfying "SJo<ST" in FIG. 5.

The fuel cell 10 of the second embodiment described above is configured, such that the joint strength SJo between the electrolyte membrane 30 and the anode electrode 40 on the outer side along the planar direction Dp than the peripheral face 58 of the cathode electrode 50 is smaller than the joint strength SJi between the electrolyte membrane 30 and the anode electrode 40 on the inner side along the planar direction Dp than the peripheral face 58 of the cathode electrode 50, as at least part of the stress suppressing structure to suppress the concentration of stress on the deformed section 35 of the electrolyte membrane 30. This configuration of the second embodiment causes the electrolyte membrane 30 and the anode electrode 40 to be shifted relative to each other on the outer side along the planar direction Dp than the peripheral face 58 of the cathode electrode 50, thereby suppressing the concentration of stress in the electrolyte membrane 30. As a result, this enhances the durability of the fuel cell 10.

C. Third Embodiment

FIG. 6 is a diagram illustrating the cross sectional configuration of a fuel cell 10 according to a third embodiment. The fuel cell 10 of the third embodiment has the same configuration as that of the first embodiment, except that the peripheral face 58 of the cathode electrode 50 has magnetism, that a magnetic material producing a repulsive force Frp against the peripheral face 58 of the cathode electrode 50 is placed on the electrode face 42-side of the anode electrode 40, and that a space is provided between the peripheral face 58 of the cathode electrode 50 and the cathode separator 620. According to the third embodiment, it is preferable that the transverse elasticity modulus Ge of the elastic member 640 is smaller than the transverse elasticity modulus Gm of the electrolyte membrane 30, but the transverse elasticity modulus Ge of the elastic member 640 may be identical with or even larger than the transverse elasticity modulus Gm of the electrolyte membrane 30.

According to the third embodiment, the peripheral face 58 of the cathode electrode 50 has magnetism. According to this embodiment, the peripheral face 58 of the cathode electrode 50 is provided with magnetism by imparting magnetism to the entire area of the cathode diffusion layer 530 of the cathode electrode 50. According to another embodiment, the peripheral face 58 of the cathode electrode 50 may be provided with magnetism by imparting magnetism to part of the cathode diffusion layer 530 in the neighborhood of the peripheral face 58.

According to this embodiment, the magnetic material producing the repulsive force Frp against the peripheral face 58 of the cathode electrode 50 is the plate-like member 630 laid on the electrode face 42-side of the anode electrode 40. According to this embodiment, the plate-like member 630 is provided with magnetism by imparting magnetism of a different polarity from that of the cathode electrode 50 to the inner side along the planar direction Dp in the plate-like member 630.

According to another embodiment, the plate-like member 630 may be provided with magnetism by imparting magnetism of a different polarity from that of the cathode electrode 50 to the entire area of the plate-like member 630. According to another embodiment, instead of providing the plate-like member 630 with magnetism, the anode separator 610 may be provided with magnetism, or a magnetic material producing a repulsive force Frp may be placed on the electrode face 42-side of the anode electrode 40, separately from the plate-like member 630 and the anode separator 610.

According to this embodiment, a gas flow path member 650 is provided between the cathode electrode 50 and the cathode separator 620 to form a flow path in which the oxidizing gas flows. The size of the gas flow path member 650 is smaller than the size of the cathode electrode 50, so that a space is formed between the peripheral face 58 of the cathode electrode 50 and the cathode separator 620. According to this embodiment, the gas flow path member 650 is a porous body of metal foam having electrical conductivity. According to another embodiment, the gas flow path member 650 may be a porous body of a carbon sintered material or may be expanded metal or punched metal.

The fuel cell 10 of the third embodiment described above is configured, such that the peripheral face 58 of the cathode electrode 50 has magnetism and that the plate-like member 630 provided as the magnetic material producing the repulsive force Frp against the peripheral face 58 of the cathode electrode 50 is placed on the electrode face 42-side of the anode electrode 40, as at least part of the stress suppressing structure to suppress the concentration of stress on the deformed section 35 of the electrolyte membrane 30. This configuration of the third embodiment causes the repulsive force Frp to relieve the pressing force applied from the peripheral face 58 of the cathode electrode 50 to the electrolyte membrane 30, thereby suppressing the concentration of stress in the electrolyte membrane 30. As a result, this enhances the durability of the fuel cell 10.

D. Fourth Embodiment

FIG. 7 is a diagram illustrating the cross sectional configuration of a fuel cell 10 according to a fourth embodiment. The fuel cell 10 of the fourth embodiment has the same configuration as that of the third embodiment, except that a magnetic material producing an attractive force Fat to the peripheral face 58 of the cathode electrode 50 is placed on the electrode face 52-side of the cathode electrode 50. According to the fourth embodiment, it is preferable that a magnetic material producing a repulsive force Frp against the peripheral face 58 of the cathode electrode 50 is placed on the electrode face 42-side of the cathode electrode 40, but the magnetic material producing the repulsive force Frp may be omitted.

According to the embodiment, the magnetic material producing the attractive force Fat to the peripheral face 58 of the cathode electrode 50 is the cathode separator 620 placed on the electrode face 52-side of the cathode electrode 50. According to this embodiment, the cathode separator 620 is provided with magnetism by imparting magnetism of the same polarity as that of the cathode electrode 50 to part of the cathode separator 620 opposed to the electrode face 52 of the cathode electrode 50.

According to another embodiment, the cathode separator 620 may be provided with magnetism by imparting magnetism of the same polarity as that of the cathode electrode 50 to the entire area of the cathode separator 620. According to another embodiment, instead of providing the cathode separator 620 with magnetism, a magnetism producing a repulsive force Frp may be placed on the electrode face 52-side of the cathode electrode 50, separately from the cathode separator 620.

The fuel cell 10 of the fourth embodiment described above is configured, such that the peripheral face 58 of the cathode electrode 50 has magnetism and that the cathode separator 620 provided as the magnetic material producing the attractive force Fat to the peripheral face 58 of the cathode electrode 50 is placed on the electrode face 52-side of the cathode electrode 50, as at least part of the stress suppressing structure to suppress the concentration of stress on the deformed section 35 of the electrolyte membrane 30. This configuration of the fourth embodiment causes the attractive force Fat to relieve the pressing force applied from the peripheral face 58 of the cathode electrode 50 to the electrolyte membrane 30, thereby suppressing the concentration of stress in the electrolyte membrane 30. As a result, this enhances the durability of the fuel cell 10.

E. Fifth Embodiment

Figure 8:
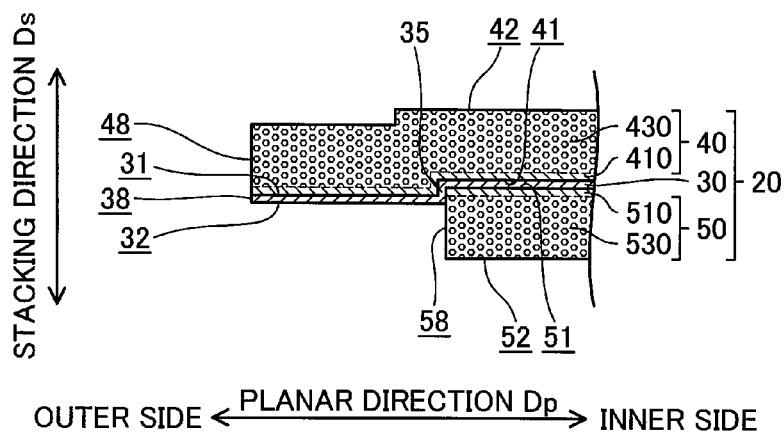
FIG. 8 is a diagram illustrating the cross sectional configuration of a fuel cell according to a fifth embodiment.

FIG. 8 is a diagram illustrating the cross sectional configuration of an MEA 20 according to a fifth embodiment. The fuel cell 10 of the fifth embodiment has the same configuration as that of the first embodiment, except a different configuration of the MEA 20. According to the fifth embodiment, it is preferable that the transverse elasticity modulus Ge of the elastic member 640 is smaller than the transverse elasticity modulus Gm of the electrolyte membrane 30, but the transverse elasticity modulus Ge of the elastic member 640 may be identical with or even larger than the transverse elasticity modulus Gm of the electrolyte membrane 30.

In the MEA 20 of the fifth embodiment, the electrolyte membrane 30 and the anode electrode 40 are folded in advance toward the cathode electrode 50-side according to the shape of the peripheral face 58 of the cathode electrode 50. In other words, according to the fifth embodiment, the deformed section 35 is formed in the MEA 20, before the MEA 20 is placed between the anode separator 610 and the cathode separator 620.

The fuel cell 10 of the fifth embodiment described above is configured, such that the electrolyte membrane 30 and the anode electrode 40 are folded in advance toward the cathode electrode 50-side according to the shape of the peripheral face 58 of the cathode electrode 50, as at least part of the stress suppressing structure to suppress the concentration of stress on the deformed section 35 of the electrolyte membrane 30. This configuration of the fifth embodiment relieves deformation of the electrolyte membrane 30 before and after the anode electrode 40 and the cathode electrode 50 are pressed against the electrolyte membrane 30, thereby suppressing the concentration of stress in the electrolyte membrane 30. As a result, this enhances the durability of the fuel cell 10.

F. Sixth Embodiment

Figure 9:
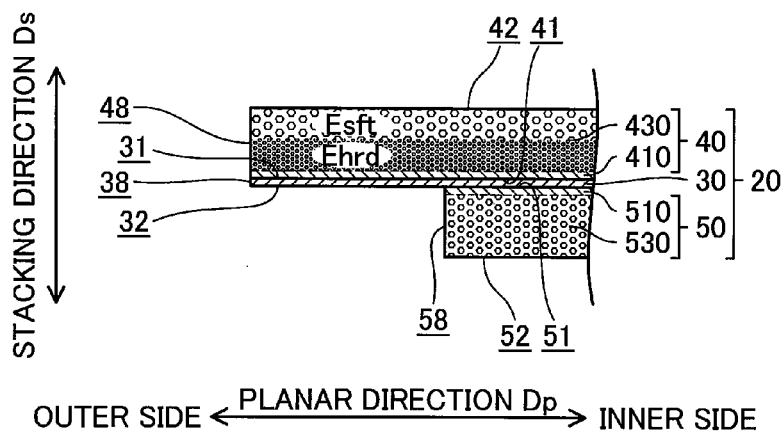
FIG. 9 is a diagram illustrating the cross sectional configuration of a fuel cell according to a sixth embodiment.

FIG. 9 is a diagram illustrating the cross sectional configuration of an MEA 20 according to a sixth embodiment. The fuel cell 10 of the sixth embodiment has the same configuration as that of the first embodiment, except a different configuration of the MEA 20. According to the sixth embodiment, it is preferable that the transverse elasticity modulus Ge of the elastic member 640 is smaller than the transverse elasticity modulus Gm of the electrolyte membrane 30, but the transverse elasticity modulus Ge of the elastic member 640 may be identical with or even larger than the transverse elasticity modulus Gm of the electrolyte membrane 30.

In the MEA 20 of the sixth embodiment, the electrode face 42 of the anode electrode 40 is softer than the electrode face 41 of the anode electrode 40. According to this embodiment, the anode electrode 40 having the softer electrode face 42 than the electrode face 41 is formed by decreasing a modulus of longitudinal elasticity Esft on the electrode 42-side of the anode diffusion layer 430 smaller than a modulus of longitudinal elasticity Ehrd on the electrode 41-side of the anode diffusion layer 430. The hardness of the anode diffusion layer 430 may be varied by changing, for example, the type and the density of the constituent material.

According to this embodiment, the anode diffusion layer 430 has a two-layered structure of a layer having the modulus of longitudinal elasticity Esft and a layer having modulus of longitudinal elasticity Ehrd. According to another embodiment, the anode diffusion layer 430 may be configured to consist of three or more different layers having different moduli of longitudinal elasticity or may be configured to gradually increase the softness from the electrode face 42-side toward the electrode face 42.

The fuel cell 10 of the sixth embodiment described above is configured, such that the electrode face 42 of the anode electrode 40 is made softer than the electrode face 41, as at least part of the stress suppressing structure to suppress the concentration of stress on the deformed section 35 of the electrolyte membrane 30. This configuration of the sixth embodiment causes the electrode face 42 to be deformed to a relatively greater extent than the electrode face 41 in the anode electrode 40 and relieves deformation of the electrolyte membrane 30, thereby suppressing the concentration of stress in the electrolyte membrane 30. As a result, this enhances the durability of the fuel cell 10.

G. Seventh Embodiment

Figure 10:
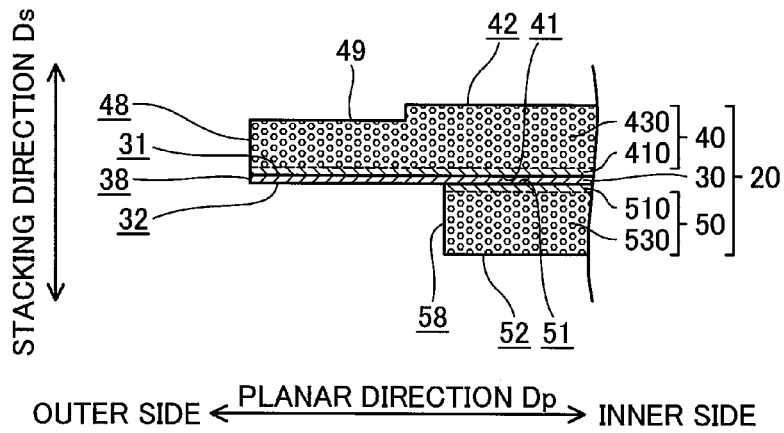
FIG. 10 is a diagram illustrating the cross sectional configuration of a fuel cell according to a seventh embodiment.

FIG. 10 is a diagram illustrating the cross sectional configuration of an MEA 20 according to a seventh embodiment. The fuel cell 10 of the seventh embodiment has the same configuration as that of the first embodiment, except a different configuration of the MEA 20. According to the seventh embodiment, it is preferable that the transverse elasticity modulus Ge of the elastic member 640 is smaller than the transverse elasticity modulus Gm of the electrolyte membrane 30, but the transverse elasticity modulus Ge of the elastic member 640 may be identical with or even larger than the transverse elasticity modulus Gm of the electrolyte membrane 30.

In the MEA 20 of the seventh embodiment, a recessed section 49 concave to the electrode face 42 of the anode electrode 40 is formed in advance on the anode electrode 40, in a shape corresponding to the shape of the plate-like member 630 provided as a pressing member to press the anode electrode 40 against the electrolyte membrane 30. In other words, according to the seventh embodiment, the recessed section 49 is formed in the MEA 20, before the MEA 20 is placed between the anode separator 610 and the cathode separator 620. According to this embodiment, the recessed section 49 is formed by cutting the electrode face 42 of the anode electrode 40.

The fuel cell 10 of the seventh embodiment described above is configured, such that the recessed section 49 concave to the electrode face 42 is formed in advance on the anode electrode 40, in a shape corresponding to the shape of the plate-like member 630 which is the pressing member, as at least part of the stress suppressing structure to suppress the concentration of stress on the deformed section 35 of the electrolyte membrane 30. This configuration of the seventh embodiment relieves deformation of the electrolyte membrane 30 via the anode electrode 40 by the plate-like member 630, thereby suppressing the concentration of stress in the electrolyte membrane 30. As a result, this enhances the durability of the fuel cell 10.

H. Eighth Embodiment

Figure 11:
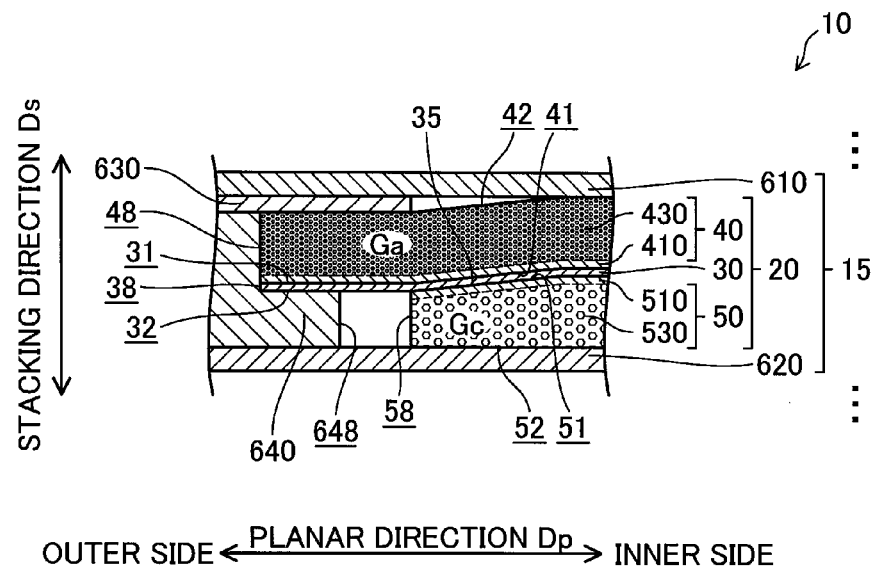
FIG. 11 is a diagram illustrating the cross sectional configuration of a fuel cell according to an eighth embodiment.

FIG. 11 is a diagram illustrating the cross sectional configuration of a fuel cell 10 according to an eighth embodiment. The fuel cell 10 of the eighth embodiment has the same configuration as that of the first embodiment, except that the rigidity of the cathode electrode 50 is made smaller than the rigidity of the anode electrode 40. According to the eighth embodiment, it is preferable that the transverse elasticity modulus Ge of the elastic member 640 is smaller than the transverse elasticity modulus Gm of the electrolyte membrane 30, but the transverse elasticity modulus Ge of the elastic member 640 may be identical with or even larger than the transverse elasticity modulus Gm of the electrolyte membrane 30.

According to the eighth embodiment, a rigidity modulus Gc of the cathode diffusion layer 530 is made smaller than a rigidity modulus Ga of the anode diffusion layer 430, so that the rigidity of the cathode electrode 50 is made smaller than the rigidity of the anode electrode 40. The rigidity moduli of the anode diffusion layer 430 and the cathode diffusion layer 530 may be varied by changing, for example, the types and the densities of the constituent materials. According to the eighth embodiment, the rigidity of the cathode electrode 50 is smaller than the rigidity of the anode electrode 40, so that the cathode electrode 50 is compressed to a greater extent in the stacking direction Ds than the anode electrode 40 as shown in FIG. 11.

The fuel cell 10 of the eighth embodiment described above is configured, such that the rigidity modulus Gc of the cathode diffusion layer 530 is made smaller than the rigidity modulus Ga of the anode diffusion layer 430, as at least part of the stress suppressing structure to suppress the concentration of stress on the deformed section 35 of the electrolyte membrane 30. This configuration of the eighth embodiment causes the cathode electrode 50 to be deformed to a greater extent than the anode electrode 40 and relieves deformation of the electrolyte membrane 30, thereby suppressing the concentration of stress in the electrolyte membrane 30. As a result, this enhances the durability of the fuel cell 10.

I. Ninth Embodiment

Figure 12:
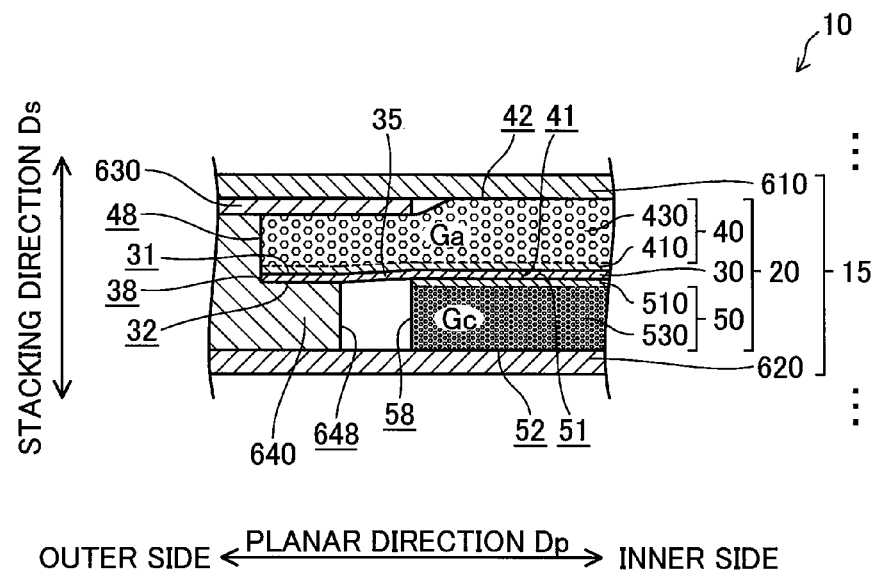
FIG. 12 is a diagram illustrating the cross sectional configuration of a fuel cell according to a ninth embodiment.

FIG. 12 is a diagram illustrating the cross sectional configuration of a fuel cell 10 according to a ninth embodiment. The fuel cell 10 of the ninth embodiment has the same configuration as that of the first embodiment, except that the rigidity of the anode electrode 40 is made smaller than the rigidity of the cathode electrode 50. According to the ninth embodiment, it is preferable that the transverse elasticity modulus Ge of the elastic member 640 is smaller than the transverse elasticity modulus Gm of the electrolyte membrane 30, but the transverse elasticity modulus Ge of the elastic member 640 may be identical with or even larger than the transverse elasticity modulus Gm of the electrolyte membrane 30.

According to the ninth embodiment, a rigidity modulus Ga of the anode diffusion layer 430 is made smaller than a rigidity modulus Gc of the cathode diffusion layer 530, so that the rigidity of the anode electrode 40 is made smaller than the rigidity of the cathode electrode 50. The rigidity moduli of the anode diffusion layer 430 and the cathode diffusion layer 530 may be varied by changing, for example, the types and the densities of the constituent materials. According to the ninth embodiment, the rigidity of the anode electrode 40 is smaller than the rigidity of the cathode electrode 50, so that the anode electrode 40 is compressed to a greater extent in the stacking direction Ds than the cathode electrode 50 as shown in FIG. 12.

The fuel cell 10 of the ninth embodiment described above is configured, such that the rigidity modulus Ga of the anode diffusion layer 430 is made smaller than the rigidity modulus Gc of the cathode diffusion layer 530, as at least part of the stress suppressing structure to suppress the concentration of stress on the deformed section 35 of the electrolyte membrane 30. This configuration of the ninth embodiment causes the anode electrode 40 to be deformed to a greater extent than the cathode electrode 50 and relieves deformation of the electrolyte membrane 30, thereby suppressing the concentration of stress in the electrolyte membrane 30. As a result, this enhances the durability of the fuel cell 10.

J. Other Embodiments

The foregoing describes the embodiments of the invention. The invention is, however, not at all limited to these embodiments, but may be implemented as various other embodiments within the scope of the invention.

For example, the above embodiments describe the fuel cells having the smaller cathode electrode 50 than the anode electrode 40. According to other embodiments, the invention may be applied to fuel cells having the smaller anode electrode 40 than the cathode electrode 50.

The stress suppressing structure in any of the above embodiments may not be necessarily provided over the entire area of the peripheral face 58 of the cathode electrode 50 placed on the inner side along the planar direction Dp than the peripheral face 38 of the electrolyte membrane 30 and the peripheral face 48 of the anode electrode 40, but the stress suppressing structure in any of the above embodiments may be provided in at least part of the area.

The two or more different stress suppressing structures in the above embodiments may be combined appropriately.

REFERENCE SIGNS LIST

10 Fuel cell
15 Cell
20 MEA
30 Electrolyte membrane
31 Anode face
32 Cathode face
35 Deformed section
38 Peripheral face
40 Anode electrode
41 Electrode face
42 Electrode face
48 Peripheral face
49 Recessed section
50 Cathode electrode
51 Electrode face
52 Electrode face
58 Peripheral face
410 Anode catalyst layer
430 Anode diffusion layer
510 Cathode catalyst layer
530 Cathode diffusion layer
610 Anode separator
620 Cathode separator
630 Plate-like member
640 Elastic member
648 End face
650 Gas flow path member

What is claimed is:

1. A fuel cell comprising:
   an electrolyte membrane;
   a first electrode joined to one surface of the electrolyte membrane; and
   a second electrode joined to an other surface of the electrolyte membrane, the other surface being different from the one surface,
   wherein a first peripheral section which is at least part of periphery of the first electrode is located on an inner side of respective peripheries of the electrolyte membrane and the second electrode in a planar direction of the first electrode,
   wherein a periphery of the electrolyte membrane is kept in a deformed state toward the first electrode side, by the periphery of the second electrode pressing the periphery of the electrolyte membrane,
   the fuel cell further comprising: a stress suppressing structure configured to suppress concentration of stress on a location along the first peripheral section in the electrolyte membrane, the stress suppressing structure placed in contact or non-contact state with the electrolyte membrane, the concentration of stress occurring when the periphery of the electrolyte membrane is deformed toward the first electrode side.

2. The fuel cell according to claim 1, wherein at least part of the stress suppressing structure is configured such that an elastic member having a smaller transverse elasticity modulus than the electrolyte membrane is pressure welded to a first electrode-side of the electrolyte membrane and on an outer side of the first peripheral section in the planar direction.

3. The fuel cell according to claim 1, wherein at least part of the stress suppressing structure is configured such that a joint strength between the electrolyte membrane and the second electrode on an outer side along the planar direction than the first peripheral section is made smaller than a joint strength between the electrolyte membrane and the second electrode on an inner side of the first peripheral section in the planar direction.

4. The fuel cell according to claim 3, wherein the electrolyte membrane and the second electrode are joined to each other on the inner side along the planar direction than the first peripheral section, while not joined to each other on the outer side of the first peripheral section in the planar direction.

5. The fuel cell according to claim 1, wherein at least part of the stress suppressing structure is configured such that the first peripheral section of the first electrode has magnetism and that a magnetic material producing a repulsive force against the first peripheral section is placed on an opposite side of the second electrode which is opposed to a joint side of the second electrode to be joined to the electrolyte membrane.

6. The fuel cell according to claim 1, wherein at least part of the stress suppressing structure is configured such that the first peripheral section of the first electrode has magnetism and that a magnetic material producing an attractive force to the first peripheral section is placed on an opposite side of the first electrode which is opposed to a joint side of the first electrode to be joined to the electrolyte membrane.

7. The fuel cell according to claim 1, wherein at least part of the stress suppressing structure is configured such that the electrolyte membrane and the second electrode are folded in advance toward the first electrode side according to a shape of the first peripheral section.

8. The fuel cell according to claim 1, wherein
the second electrode includes:
one electrode face which is a joint surface to be joined to the electrolyte membrane; and
an other electrode face which is an opposite surface opposed to the one electrode face, and
at least part of the stress suppressing structure is configured such that the other electrode face is made softer than the one electrode face.

9. The fuel cell according to claim 1, wherein
the second electrode includes:
one electrode face which is a joint surface to be joined to the electrolyte membrane; and
an other electrode face which is an opposite surface opposed to the one electrode face, and
at least part of the stress suppressing structure is configured such that a recessed section provided as a concave part of the other electrode face is formed in advance in the second electrode, in a shape corresponding to a shape of a pressing member that presses the second electrode against the electrolyte membrane.

10. The fuel cell according to claim 1, wherein at least part of the stress suppressing structure is configured such that rigidity of the first electrode is made smaller than rigidity of the second electrode.

11. The fuel cell according to claim 1, wherein at least part of the stress suppressing structure is configured such that rigidity of the second electrode is made smaller than rigidity of the first electrode.

12. The fuel cell according to claim 1, wherein the second electrode has the same size as the electrolyte membrane.

* * * * *